US012652466B2

(12) United States Patent
Tang et al.

(10) Patent No.: US 12,652,466 B2
(45) Date of Patent: Jun. 9, 2026

(54) OPTICAL ANTI-SHAKE APPARATUS AND CAMERA MODULE

(71) Applicant: GALAXYCORE SHANGHAI LIMITED CORPORATION, Shanghai (CN)

(72) Inventors: Wei Tang, Shanghai (CN); Jun Luo, Shanghai (CN)

(73) Assignee: GALAXYCORE SHANGHAI LIMITED, Shanghai (CN)

( * ) Notice: Subject to any disclaimer, the term of this patent is extended or adjusted under 35 U.S.C. 154(b) by 78 days.

(21) Appl. No.: 18/691,798

(22) PCT Filed: Sep. 9, 2022

(86) PCT No.: PCT/CN2022/118161
§ 371 (c)(1),
(2) Date: Mar. 13, 2024

(87) PCT Pub. No.: WO2023/036304
PCT Pub. Date: Mar. 16, 2023

(65) Prior Publication Data
US 2024/0380976 A1 Nov. 14, 2024

(30) Foreign Application Priority Data
Sep. 13, 2021 (CN) .......................... 202122208414.1

(51) Int. Cl.
*H04N 23/68* (2023.01)
*F03G 7/06* (2006.01)
(Continued)

(52) U.S. Cl.
CPC ....... *H04N 23/687* (2023.01); *F03G 7/06143* (2021.08); *G03B 5/00* (2013.01);
(Continued)

(58) Field of Classification Search
None
See application file for complete search history.

(56) References Cited

U.S. PATENT DOCUMENTS

| | | | |
|---|---|---|---|
| 2019/0235380 A1 | 8/2019 | Nakamura | |
| 2020/0192187 A1* | 6/2020 | Lee .................... | H02K 41/0356 |

(Continued)

FOREIGN PATENT DOCUMENTS

| | | |
|---|---|---|
| CN | 208986774 U | 6/2019 |
| CN | 209233930 U | 8/2019 |

(Continued)

OTHER PUBLICATIONS

International Search Report and Written Opinion received for PCT Serial No. PCT/CN2022/118161 on Dec. 12, 2022, 11 pgs.

*Primary Examiner* — Paul M Berardesca
(74) *Attorney, Agent, or Firm* — Merchant & Gould P.C.

(57) ABSTRACT

An optical image stabilization apparatus and a camera module are provided. The optical image stabilization apparatus includes: a shape memory alloy driving component, a fixed component, and a movable component. The shape memory alloy driving component is disposed between the fixed component and the movable component to drive the movable component to move relative to the fixed component. The shape memory alloy driving component is connected with the fixed component and/or the movable component by means of through a metal spacer, and the metal spacer is detabably connected with the fixed component and/or with the movable component.

19 Claims, 4 Drawing Sheets

(51) Int. Cl.
    *G03B 5/00*           (2021.01)
    *G03B 30/00*         (2021.01)
    *H04N 23/54*         (2023.01)
    *H04N 23/57*         (2023.01)

(52) U.S. Cl.
    CPC ............. *G03B 30/00* (2021.01); *H04N 23/54*
        (2023.01); *H04N 23/57* (2023.01); *G03B*
        *2205/0007* (2013.01); *G03B 2205/0076*
        (2013.01)

(56) References Cited

U.S. PATENT DOCUMENTS

| | | | |
|---|---|---|---|
| 2021/0072554 A1* | 3/2021 | Li | G03B 5/02 |
| 2022/0136488 A1* | 5/2022 | Kazi | G02B 6/3859 |
| | | | 60/527 |
| 2023/0004065 A1* | 1/2023 | Osada | G03B 30/00 |

FOREIGN PATENT DOCUMENTS

| | | |
|---|---|---|
| CN | 110727122 A | 1/2020 |
| CN | 213522034 U | 6/2021 |
| CN | 216774836 U | 6/2022 |
| JP | 2007058076 A | 3/2007 |

* cited by examiner

OPTICAL ANTI-SHAKE APPARATUS AND CAMERA MODULE

CROSS-REFERENCE TO RELATED APPLICATIONS

This application is a National Stage of International Application No.: PCT/CN2022/118161, filed on Sep. 9, 2022, which claims priority to Chinese Application No.: 202122208414.1, filed on Sep. 13, 2021, both of which are incorporated herein by reference.

TECHNICAL FIELD

The present disclosure generally relates to imaging technology field, and more particularly, to an optical image stabilization apparatus and a camera module.

BACKGROUND

When taking pictures by handheld portable intelligent devices, physiological trembling of the human body is not avoidable and can not be overcome through training either, which will make handheld portable intelligent devices inevitably shake with the human body when taking pictures, leading to a degradation of the pictures quality, for example, making the pictures blurred or not clear.

Current handheld portable intelligent devices use shape memory alloy driving components within a camera module to drive a lens component along X axis and Y axis directions, so as to compensate for physiological trembling of the human body to obtain high-quality pictures.

However, the yield of the camera module or the optical image stabilization apparatus is often lowered by the poor assembly of the shape memory alloy driving components during an assembly process of the camera module or the failure of the shape memory alloy driving components, which may lead to great loss.

SUMMARY

The present disclosure provides an optical image stabilization apparatus and a camera module for avoiding the optical image stabilization apparatus or the entire camera module to be discarded as useless due to poor assembly or failure of a shape memory alloy driving component, thus reducing losses, improving yields, and saving the mass production cost.

Based on above considerations, embodiments of the present disclosure provide an optical image stabilization apparatus. The optical image stabilization apparatus includes:

a shape memory alloy driving component, a fixed component, and a movable component. The shape memory alloy driving component is disposed between the fixed component and the movable component to drive the movable component to move relative to the fixed component.

The shape memory alloy driving component is connected with the fixed component and/or with the movable component through a metal spacer, and the metal spacer is detachably connected with the fixed component and/or with the movable component.

According to some embodiments, the metal spacer is surrounded by a solder and/or an electrically conductive adhesive to achieve the connection of the metal spacer with the fixed component and/or the movable component.

According to some embodiments, a solder and/or an electrically conductive adhesive is disposed between the metal spacer and the fixed component, and/or between the metal spacer and the movable component.

According to some embodiments, a solder pad is disposed on a surface of the fixed component or a surface of the movable component, and the shape memory alloy driving component is connected with the solder pad of the fixed component and/or with the solder pad of the movable component through the metal spacer.

According to some embodiments, the metal spacer is an electrically conductive metal spacer to achieve an electrical connection of the metal spacer with the fixed component and/or the movable component.

According to some embodiments, the metal spacer includes a first metal spacer and a second metal spacer, the shape memory alloy driving component is connected with the fixed component through the first metal spacer, and the shape memory alloy driving component is connected with the movable component through the second metal spacer. The first metal spacer and the second metal spacer have a thickness difference to match a height difference between the movable component and the fixed component.

According to some embodiments, the shape memory alloy driving component and the metal spacer are connected by laser soldering.

According to some embodiments, the shape memory alloy driving component includes at least one shape memory alloy wire assembly, and the shape memory alloy wire assembly includes a single shape memory alloy wire and a fixing portion for fastening both ends of the shape memory alloy wire.

According to some embodiments, the fixing portion further includes a bending section.

According to some embodiments, the movable component is adapted to carry a lens unit or an image sensor chip, and the lens unit or the image sensor chip can be driven to move along the X and Y directions and to rotate in a plane by the shape memory alloy driving component, resulting in an optical image stabilization performance.

The present disclosure also provides a camera module, and the camera module includes the aforementioned optical image stabilization apparatus.

According to some embodiments, a lens unit is carried by the movable component to move.

The optical image stabilization apparatus and the camera module provided by the present disclosure have the following advantages:

Due to the detachable connection between the metal spacer and the fixed component or/and the movable component, a poorly assembled shape memory alloy driving component or a failed shape memory alloy driving component is replaceable, which avoids discarding the entire camera module, improving the yield of the camera module and reducing the mass production cost.

The thickness of the metal spacer can be adjusted to match the height difference between the movable component and the fixed component to keep the shape memory alloy wire in horizontal state, such that the movable component can be driven to move along the X and Y directions and to rotate in the plane.

The bending section is provided to match the height difference between the movable component and the fixed component, such that the shape memory alloy wire can be kept in horizontal state and the movable component can be driven to move along the X and Y directions and to rotate in a plane.

BRIEF DESCRIPTION OF THE DRAWINGS

Various additional features, objects and advantages of the present disclosure can be more apparent with reference to the detailed description of non-limiting embodiments and accompanying drawings that follow.

In the figures, identical or similar reference numerals indicate identical or similar apparatus (modules) or steps throughout different figures.

DETAILED DESCRIPTION

Many specific details are set forth in the following description to facilitate a full understanding of the present disclosure. However, the present disclosure can be implemented in many other ways different from those described herein, one skilled in the art may make similar extensions without violating the connotations of the present disclosure, and thus the present disclosure is not limited by the specific embodiments disclosed below.

The present disclosure is described in detail with reference to accompanying drawings, and in embodiments of the present disclosure, for ease of illustration, accompanying drawings are merely examples, which shall not limit the scope of the claims of the present disclosure herein.

In order to make above objects, features and advantages of the present disclosure more obvious and understandable, the following is a detailed description of the present disclosure in conjunction with accompanying drawings.

Figure 1:
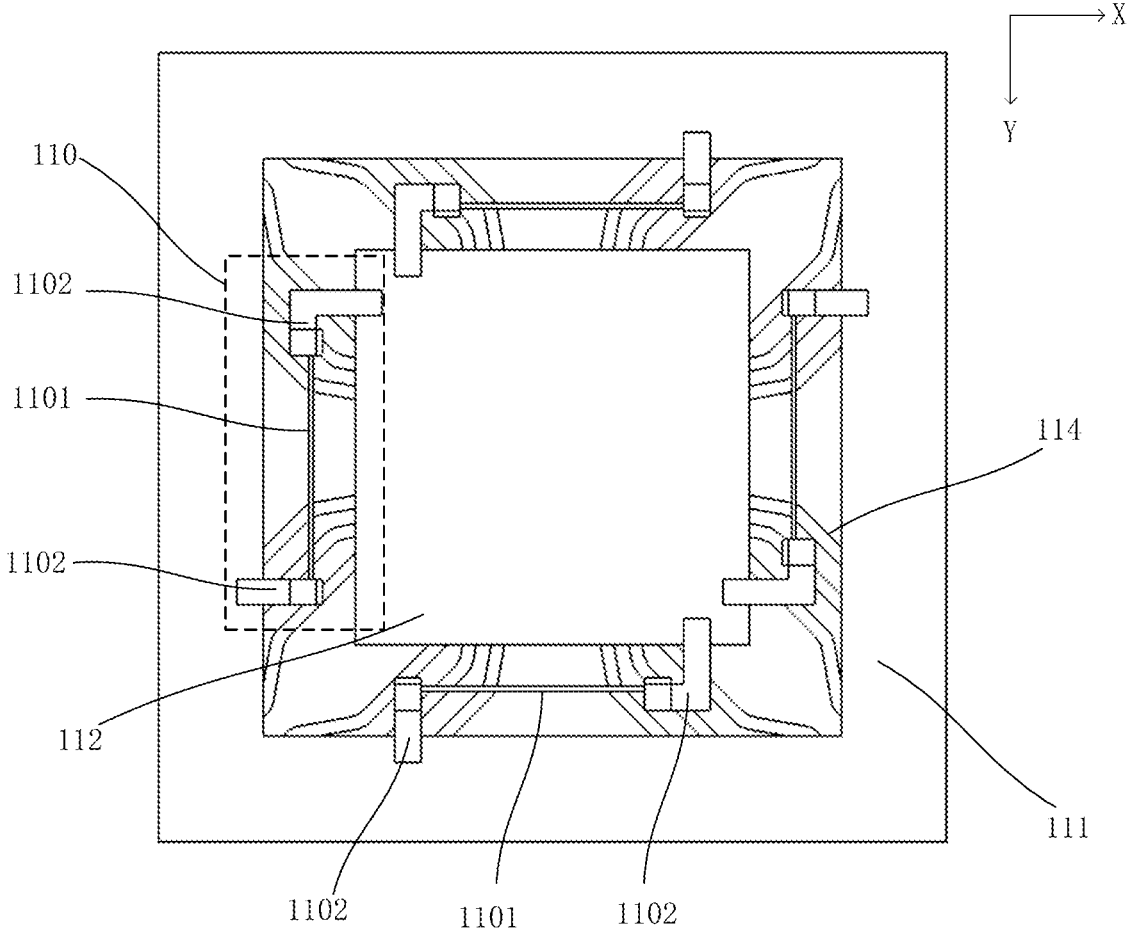
FIG. 1 schematically shows a structural diagram of a top view of an optical image stabilization apparatus according to an embodiment of the present disclosure.
Figure 2:
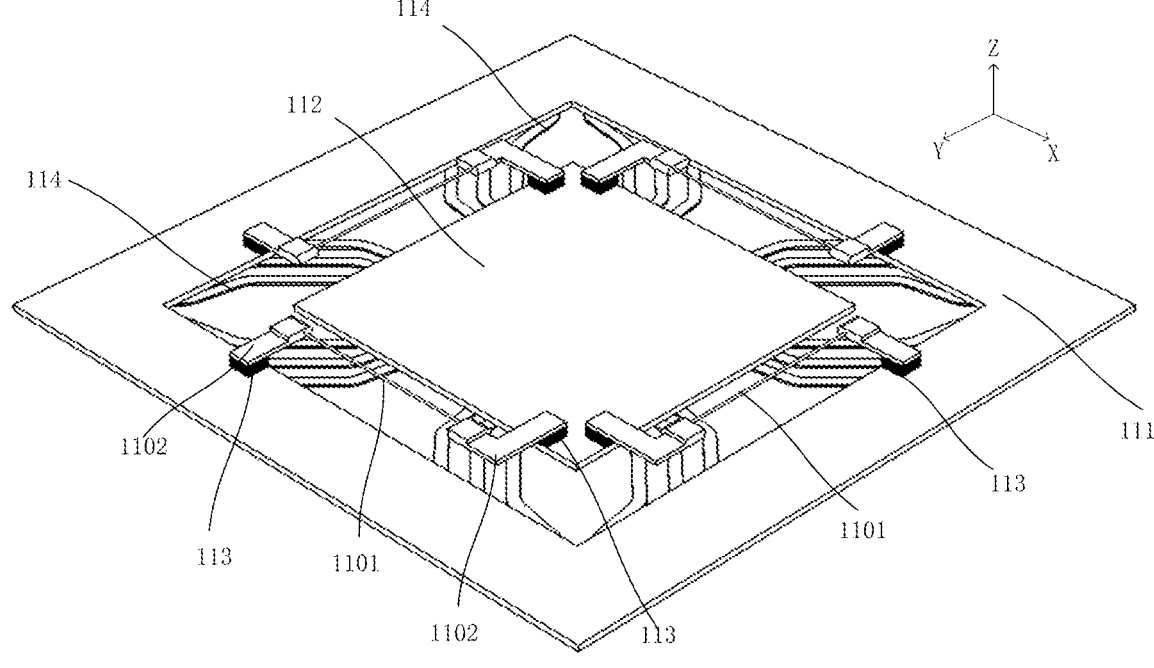
FIG. 2 schematically shows a diagram of a three-dimensional structure of an optical image stabilization apparatus according to an embodiment of the present disclosure.

An embodiment provides an optical image stabilization apparatus. Referring to FIG. 1 and FIG. 2, the optical image stabilization apparatus includes:

a shape memory alloy driving component, a fixed component 111, and a movable component 112. The shape memory alloy driving component is disposed between the fixed component 111 and the movable component 112 to drive the movable component 112 to move relative to the fixed component 111.

The shape memory alloy driving component is connected with the fixed component 111 and/or with the movable component 112 through a metal spacer 113, and the metal spacer 113 is detachably connected with the fixed component and/or with the movable component.

Figure 3:
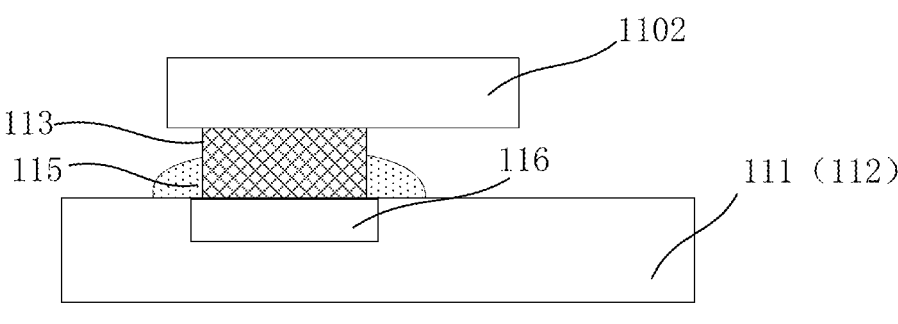
FIG. 3 schematically shows a structural diagram of a metal spacer in connection with a fixed component or with a movable component according to an embodiment of the present disclosure.
Figure 4:
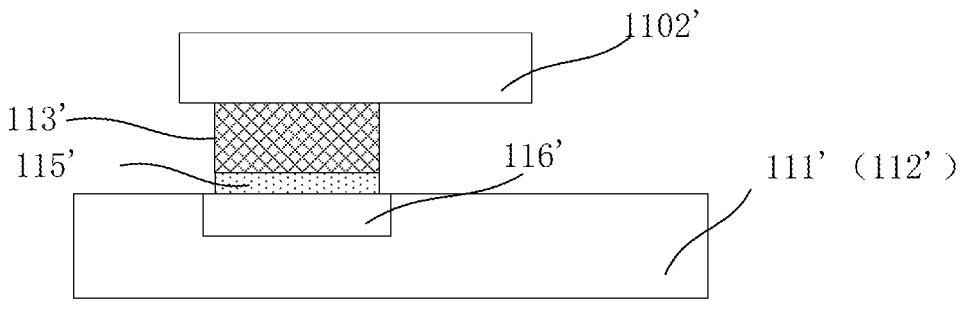
FIG. 4 schematically shows a structural diagram of a metal spacer in connection with a fixed component or with a movable component according to another embodiment of the present disclosure.

The metal spacer 113 is connected with the fixed component 111 and/or with the movable component 112 by means of a detachable connection, for example, by means of soldering, adhesion, or crimping, such that, in the case of poor assembly or failure of shape memory alloy driving component, the shape memory alloy driving component can be disassembled by disconnecting the metal spacer from the movable component or the fixed component, without destroying the movable component or the fixed component, which avoids the whole optical image stabilization apparatus being discarded. Referring to FIG. 3, the metal spacer 113 is bonded to the movable component 112 or to the fixed component 111 by a solder or an electrically conductive adhesive 115. The solder or the electrically conductive adhesive 115 is disposed around the metal spacer 113, which is conducive to the installation and removal of the metal spacer 113. According to other embodiments, referring to FIG. 4, the solder or the electrically conductive adhesive 115' is disposed between the metal spacer 113' and the movable component 112' or between the metal spacer 113' and the fixed component 111'.

Referring to FIG. 3, a solder pad 116 is disposed on a surface of the fixed component 111 or a surface of the movable component 112, and the shape memory alloy driving component is connected with the solder pad 116 of the fixed component or with the solder pad 116 of the movable component through the metal spacer 113, causing electrical and fixed connection. For ease of soldering or adhesion, an area of the metal spacer 113 is preferably less than or equal to an area of the solder pad 116. According to other embodiments, an area of the metal spacer 113 is greater than an area of the solder pad, which should not constitute limitation of the present disclosure herein.

The metal spacer 113 may be an electrically conductive metal spacer to achieve an electrical connection between the metal spacer 113 and the fixed component or/and an electrical connection between the metal spacer 113 and the movable component. The metal spacer 113 may be made of a copper alloy, a stainless steel, an aluminum alloy, and the like, which should not constitute limitation of the present disclosure herein. According to some embodiments, the metal spacer may be made of a copper alloy.

Referring to FIG. 1 and FIG. 2, the shape memory alloy driving component includes at least one shape memory alloy wire assembly 110, and the shape memory alloy wire assembly 110 includes a single shape memory alloy wire 1101 and a fixing portion 1102 for fastening both ends of the shape memory alloy wire 1101.

The fixing portion 1102 and the metal spacer 113 are connected by laser soldering to ensure a stable connection between the metal spacer and the fixing portion. The fixing portion may also be connected with the metal spacer in other ways, which should not constitute limitation of the present disclosure herein.

Figure 5:
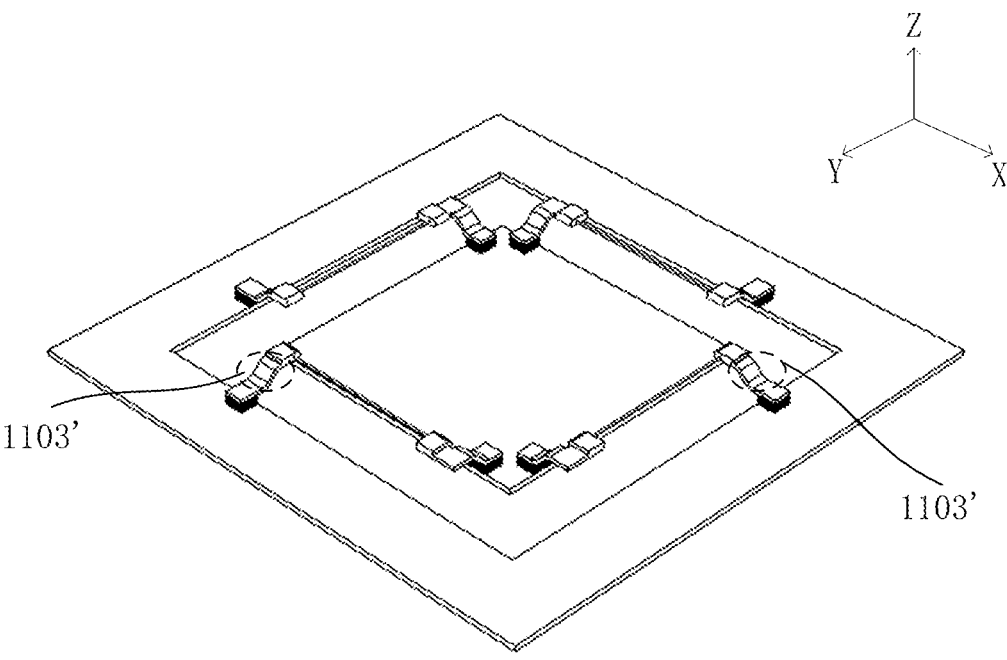
FIG. 5 schematically shows a diagram of a three-dimensional structure of an optical image stabilization apparatus according to another embodiment of the present disclosure.

According to some embodiments, referring to FIG. 5, the fixing portion may also include a bending section 1103', and a height of the shape memory alloy wire may be adjusted by the bending section 1103', which ensures that the shape memory alloy wire remains in horizontal state after installation with the fixed component and the movable component.

According to some embodiments, a height difference exists between the fixed component and the movable component. In order to match the height difference so that the shape memory alloy wire of the shape memory alloy driving component remains in horizontal state after installation, a thickness of the metal spacer may be adjusted to match the height difference. The metal spacer includes a first metal spacer and a second metal spacer, the shape memory alloy driving component is connected with the fixed component through the first metal spacer, and the shape memory alloy driving component is connected with the movable component through the second metal spacer. The first metal spacer and the second metal spacer have a thickness difference to match the height difference between the movable component and the fixed component. According to some embodiments, the movable component 112 may be adapted to carry a lens unit or an image sensor chip, and the lens unit or the image sensor chip can be driven to move along the X and Y directions and to rotate in a plane by the shape memory alloy driving component, so as to realize optical image stabilization function.

Furthermore, referring to FIG. 1 and FIG. 2, the optical image stabilization apparatus further includes a rebound component 114 for driving the movable component 112 back to its original position. One end of the rebound component 114 is connected with the fixed component 111, and the other end of the rebound component 114 is connected with the movable component 112. In this embodiment, the rebound component 114 is a resilient metal wire. In other embodiments, the rebound component may be a flexure component or the like, which should not constitute limitation of the present disclosure herein.

Figure 6:
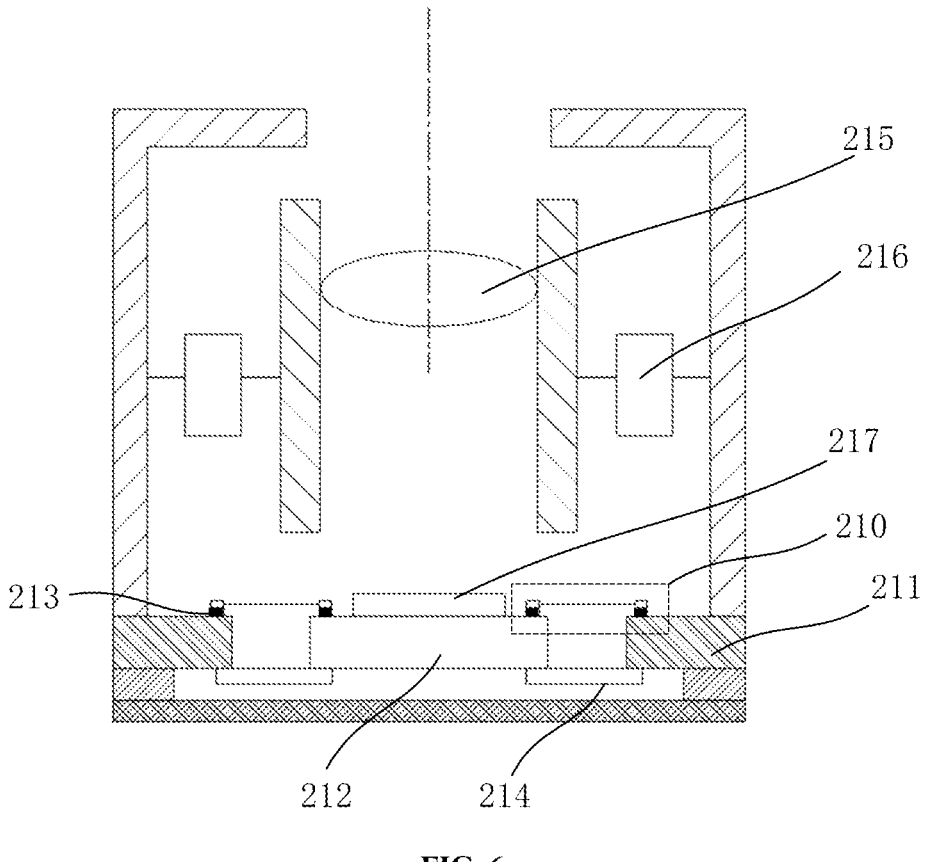
FIG. 6 schematically shows a structural diagram of a cross-section of a camera module according to an embodiment of the present disclosure.

Some embodiments of the present disclosure also provide a camera module including the optical image stabilization apparatus as described above. Referring to FIG. 6, specifically, the camera module includes:

a lens unit 215, a fixed component 211, a movable component 212, and a shape memory alloy driving component 210.

One end of the shape memory alloy driving component 210 is connected with the fixed component 211, and the other end of the shape memory alloy driving component 210 is connected with the movable component 212. The shape memory alloy driving component 210 is connected with the fixed component 211 and with the movable component 212 through a metal spacer 213.

According to some embodiments, the movable component 212 carries an image sensor chip 217 and can drive the image sensor chip 217 to move along the X and Y directions and to rotate in a plane, so as to achieve an optical image stabilization performance. The rebound component 214 is used to drive the movable component 212 back to its original position. Due to the detachable connection between the metal spacer 213 and the fixed component 211 or/and the movable component 212, a poorly assembled shape memory alloy driving component or a failed shape memory alloy driving component can be replaced, thereby avoiding the entire camera module being discarding.

According to some embodiments, the movable component is used to carry the lens unit and drive the lens unit to move along the X, Y axes to achieve an optical image stabilization performance.

According to some embodiments, the present disclosure provides an optical image stabilization apparatus and a camera module, due to a detachable connection between a metal spacer and a fixed component or/and a movable component, a poorly assembled shape memory alloy driving component or a failed shape memory alloy driving component can be replaced, thereby avoiding to discard the entire optical image stabilization apparatus or the camera module.

For those skilled in the art, the present disclosure is obviously not limited to the details of the above exemplary embodiments, and the present disclosure can be implemented in other specific ways without departing from the spirit or basic features of the present disclosure. Accordingly, the embodiments should be considered in all respects as illustrative and not restrictive. Furthermore, it is evident that the word "comprising" does not exclude other elements and steps, and the word "a" does not exclude the plural. Several components stated in claims of an apparatus can also be implemented by one component. Words such as first and second, are used to indicate names and do not indicate any specific order.

What is claimed is:

1. An optical image stabilization apparatus, comprising:
a shape memory alloy driving component, a fixed component, and a movable component, wherein the shape memory alloy driving component is disposed between the fixed component and the movable component to drive the movable component to move relative to the fixed component;
wherein the shape memory alloy driving component comprises at least one shape memory alloy wire assembly, the shape memory alloy wire assembly comprises a single shape memory alloy wire and a fixing portion for fastening both ends of the shape memory alloy wire, the fixing portion of the shape memory alloy wire assembly of the shape memory alloy driving component is connected with the fixed component and/or with the movable component through a metal spacer, and the metal spacer is detachably connected with the fixed component and/or with the movable component.

2. The optical image stabilization apparatus according to claim 1, wherein the metal spacer is surrounded by a solder and/or an electrically conductive adhesive to achieve the connection of the metal spacer with the fixed component and/or the movable component.

3. The optical image stabilization apparatus according to claim 1, wherein a solder and/or an electrically conductive adhesive is disposed between the metal spacer and the fixed component, and/or between the metal spacer and the movable component.

4. The optical image stabilization apparatus according to claim 1, wherein a solder pad is disposed on a surface of the fixed component or a surface of the movable component, and the shape memory alloy driving component is connected with the solder pad of the fixed component and/or with the solder pad of the movable component through the metal spacer.

5. The optical image stabilization apparatus according to claim 1, wherein the metal spacer is an electrically conductive metal spacer to achieve an electrical connection of the metal spacer with the fixed component and/or the movable component.

6. The optical image stabilization apparatus according to claim 1, wherein the metal spacer comprises a first metal spacer and a second metal spacer, the shape memory alloy driving component is connected with the fixed component through the first metal spacer, the shape memory alloy driving component is connected with the movable component through the second metal spacer, and the first metal spacer and the second metal spacer have a thickness difference to match a height difference between the movable component and the fixed component.

7. The optical image stabilization apparatus according to claim 1, wherein the shape memory alloy driving component and the metal spacer are connected by laser soldering.

8. The optical image stabilization apparatus according to claim 1, wherein the fixing portion further comprises a bending section.

9. The optical image stabilization apparatus according to claim 1, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

10. A camera module, comprising the optical image stabilization apparatus according to claim 1.

11. The camera module according to claim 10, wherein a lens unit is carried by the movable component to move.

12. The optical image stabilization apparatus according to claim 2, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

13. The optical image stabilization apparatus according to claim 3, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

14. The optical image stabilization apparatus according to claim 4, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

15. The optical image stabilization apparatus according to claim 5, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

16. The optical image stabilization apparatus according to claim 6, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

17. The optical image stabilization apparatus according to claim 7, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

18. The optical image stabilization apparatus according to claim 1, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

19. The optical image stabilization apparatus according to claim 8, wherein the movable component is adapted to carry a lens unit or an image sensor chip, and the lens unit or the image sensor chip can be driven to move along the X and Y directions and to rotate in a plane by the shape memory alloy driving component to achieve an optical image stabilization performance.

* * * * *